Figure 1:
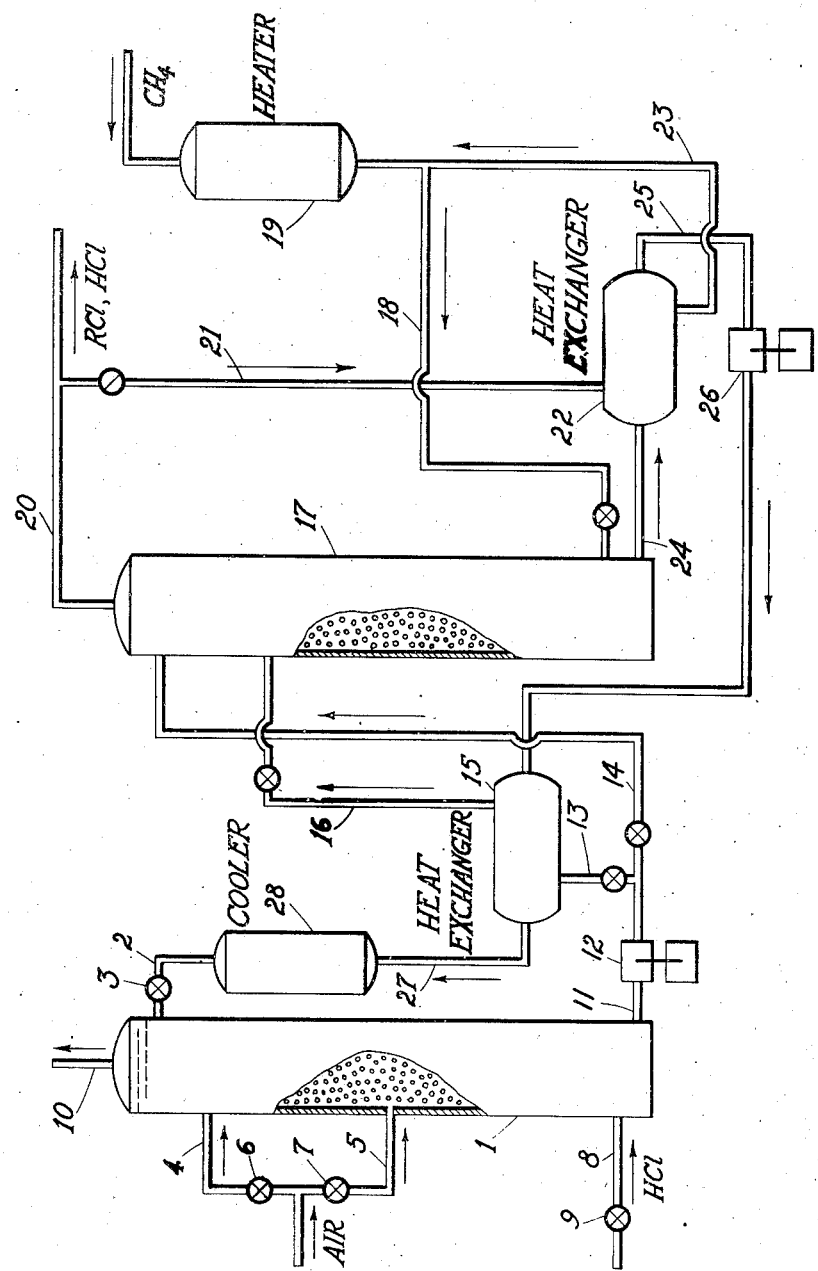

Sept. 17, 1946.  E. GORIN  2,407,828
HYDROCARBON CONVERSION PROCESS
Filed Oct. 25, 1943

Everett Gorin
INVENTOR
BY Sidney A. Johnson
ATTORNEY

Patented Sept. 17, 1946

2,407,828

UNITED STATES PATENT OFFICE 2,407,828

HYDROCARBON CONVERSION PROCESS

Everett Gorin, Dallas, Tex., assignor, by mesne assignments, to Socony-Vacuum Oil Company, Incorporated, New York, N. Y., a corporation of New York Application October 25, 1943, Serial No. 507,618

17 Claims. (Cl. 260—659)

The invention relates to the manufacture of organic halides from hydrochloric acid. Various organic halides are of great importance in the organic chemical and petroleum industries, as reactive intermediates for the production of many essential materials. The manufacture of butadiene from dichlorbutane, the alkylation of methyl chloride with benzene to give toluene, and the hydrolysis of chlorbenzene to give phenol, are but a few examples of the industrial importance of these organic halides.

Recently, in U. S. Patent Number 2,320,274, granted May 25, 1943, I have proposed the use of alkyl halides as intermediates in the production of valuable aromatic and unsaturated hydrocarbons from the gaseous paraffins. Methyl chloride, in particular, is a valuable intermediate for the production of benzene, toluene, acetylene and ethylene, from methane.

In all of the processes mentioned above, halogen acids are liberated both in the production of the halides by a chlorination procedure and in their subsequent conversion to the final product. The commercial feasibility of most of these processes depends upon the economical recovery of the halogen acids produced and their reconversion to the corresponding halide.

Several prior art methods have attempted the recovery and reconversion of halogen acids by processes wherein the oxidation of the acid and the chlorination of methane are carried out simultaneously. For example, it has been suggested that methyl chloride be produced by passing a mixture of methane, hydrogen chloride and air, or oxygen, over a supported copper halide catalyst. In a similar manner it has been proposed to manufacture chlorbenzene, by reaction between benzene, hydrochloric acid and air.

In the use of methods involving simultaneous oxidation of hydrochloric acid and chlorination of hydrocarbons, specifically in the case of methane, considerable oxidation of the methane takes place. The yields of chloromethane obtained by this method are small while considerable amounts of hydrogen chloride pass through the converter unchanged. The analogous method for the production of aryl chlorides, such as chlorbenzene, is somewhat more satisfactory, the oxychlorination of benzene being much more rapid than the corresponding reaction with methane, especially when promoted copper halide catalysts ore used. The reaction with benzene can therefore be carried out at lower temperatures than the corresponding methane reaction, thus greatly reducing the possibility of side reactions, such as oxidation and hydrolysis. Low temperature operation, however, greatly limits the throughput obtainable, especially if quantitative conversion of hydrogen chloride to chlorbenzene is to be attained in a single pass.

A further disadvantage of this type of process, whether the halogen acid is reacted with either a paraffin or an aromatic compound, lies in the fact that the organic halides produced are diluted with water vapor and large quantities of air from which the quantitative recovery of the organic halide requires additional and expensive processing.

It is evident that heretofore employed methods for the recovery of halogen acids and their conversion directly to organic halides, cannot be considered satisfactory from an economic standpoint due to inherent disadvantages, discussed above. The procedure generally followed has been, to recover the halogen value from the halogen acid, and to form additional organic halide by the direct reaction of the hydrocarbon with the recovered halogen.

The primary object of the present invention is to provide an improved and economical method capable of continuous operation, for the recovery of halogen acids and their reconversion directly to organic halides. Another object of the invention is the provision of a method whereby halogen acids are efficiently and completely utilized to produce organic halides on a quantitative basis. A further object is to provide a method whereby the organic halides produced are free from dilution with air. Other and further objects of the invention will be apparent from the following detailed description thereof and the accompanying drawing.

The invention involves first the steps of bringing the halogen acid gas and an oxygen containing gas into direct contact with a counterflow of a cuprous chloride containing salt melt, whereby the said cuprous chloride is converted to a cupric form, in the manner disclosed in my copending application, Serial Number 507,616, filed October 25, 1943, entitled "Recovery of halogens." The cupric halide melt is then transferred to a separate reaction zone wherein it is contacted with a counterflow of hydrocarbon gases or vapors, to form alkyl or aryl halides and reform cuprous chloride therein. The organic halide product is recovered and the melt returned to the first reaction zone for recycling through the process.

One form of apparatus for practicing my invention is shown in the accompanying drawing, although my invention is not to be construed as limited to any particular apparatus.

Referring to the drawing, a melt containing a major proportion of cuprous chloride and a minor proportion of potassium chloride is admitted to the top of packed tower 1, through line 2, provided with a suitable control valve 3. The temperature of the melt entering the tower 1, should lie between 250° C. and 400° C. and preferably from 350° C. to 400° C. Air is admitted to the tower at two points, viz., through inlet line 4, near the top of the tower but below the point of entry of the melt, and through inlet line 5, somewhat below the midpoint of the tower, each of these lines being provided with suitable control valves 6 and 7. Hydrochloric acid gas is admitted near the bottom of the tower, through line 8, provided with control valve 9.

Thus the melt, descending in the tower, is contacted, first by air entering the tower through inlet line 4, and then by a mixture of air and hydrogen chloride gas, which is admitted to the main reaction zone of the tower through lines 5 and 8. The gases are blown up through the tower countercurrent to the descending melt. Waste gases, almost completely free of hydrogen chloride, leave the top of the tower through line 10. If desired this small amount of hydrogen chloride present in the exhaust gases may be recovered by condensing out a dilute solution of hydrochloric acid. The excess water may then be fractionated off and the hydrochloric acid azeotrope residue vaporized and returned to the tower through line 8.

The admission of the reaction gases to the tower in the manner just above described is advantageous for the following reasons:

1. The probability of hydrogen chloride escaping unreacted from the top of the tower, is effectively diminished, because cupric oxychloride, formed by the initial contacting of the melt with air, from inlet line 4, will adsorb practically all the hydrogen chloride which may pass through the main portion of the contact zone unchanged.

2. High throughput capacities are readily attained, since the air-hydrogen chloride mixture which contacts the melt in the main reaction zone, causes oxidation and chlorination of the melt to proceed simultaneously.

3. The melt on leaving the bottom of the tower is substantially free of water vapor, since in the last portion of its passage down through the tower, it is subjected to the stripping action of dry hydrogen chloride.

In order that hydrogen chloride gas be efficiently utilized in the tower, it is recommended that the admission of the reaction gases be controlled, so as to maintain a ratio of not more than 4 moles of hydrogen chloride per mole of oxygen entering the tower. The amount of hydrogen chloride fed to the tower should, however, be nearly equal to four times the amount of oxygen actually absorbed by the melt to prevent the building up of the oxychloride in the melt.

The exothermic heat of reaction causes the melt to heat up considerably. The temperatures of the input gases should, therefore, be so regulated that, after taking heat losses into account, the temperature of the melt at the bottom of the tower does not exceed 475° C., otherwise excessive evolution of chlorine will take place. Some chlorine evolution from the melt at the bottom of the tower is allowable, since most of the chlorine will be reabsorbed by the melt in the cooler upper portion of the tower wherein the melt is at a temperature below 400° C.

The melt, just before passing out of the oxychlorination zone may be subjected to the purging action of a stream of hydrogen chloride or of an inert gas, such as nitrogen. This treatment will substantially free the melt of water vapor and also help to sweep the waste vapors from the reaction zone.

The melt leaving the reaction tower through line 11, provided with a suitable pump 12, is divided into two streams in lines 13 and 14. The melt stream in line 13 passes into the heat exchanger 15, wherein it is preheated before flowing up through line 16, to enter reaction tower 17, at a point somewhat below the top of the tower. The hot melt then flows downwards through the tower, and is brought into direct contact with a counterflow of preheated hydrocarbon gas, or vapor, which is admitted through inlet line 18, near the bottom of the tower.

The chlorination reaction occurring in the tower may be represented by the general equation:

$$RH + 2CuCl_2 \rightarrow RCl + HCl + Cu_2Cl_2$$

where R represents either an alkyl or aryl group.

In most instances the chlorination reaction occurring in the tower is either thermoneutral or slightly exothermic in nature. However, with certain hydrocarbons, e. g. methane, the reaction may be slightly endothermic.

In any instance heat may be conveniently supplied to the chlorination tower by passing the gas, or vapor, to be chlorinated, through the heating unit 19, prior to admitting it to the bottom of the reaction tower, through line 18.

The amount of preheating of the hydrocarbon gas, or vapor, is preferably controlled so that the temperature obtaining in the chlorinating zone, during the operation of the process, is within the range of from 325° C. to 500° C., after heat losses from the tower are taken into account. Indirect external heating may also be used if desirable. The most favorable operating temperature within this range will, of course, vary somewhat according to the particular hydrocarbon to be chlorinated. For example in the case of aromatic hydrocarbons, such as benzene, and with higher paraffins such as propane and butane, temperatures in the lower end of the range, i. e. 325° C. to 400° C., are very satisfactory. Also, the chlorination of olefins, particularly those higher than ethylene, may be readily effected at temperatures below 400° C. In the case of methane, however, higher temperatures, i. e., above 375° C., should be employed, and preferably between 425° C. and 475° C.

The remainder of the melt in line 14 may be cooled somewhat and is then admitted at a point close to the top of the tower. This relatively cool melt, descending through the upper part of the tower, functions as a scrubbing agent, condensing any metal halides that may be volatilized, and separating them from the product containing gas passing upwards through the tower towards outlet line 20. Hydrogen chloride formed in the chlorination reaction of tower 17 will be contained in the product stream issuing from the tower through line 20. This gas may be recovered from the product stream and returned to tower 1 for reuse in the oxychlorination step of the process.

Where large conversions of hydrocarbon to halide are desired, a portion of the product stream in line 20 may be recycled through the tower. In this way the production of halide per unit volume of hydrocarbon gas, or vapor, entering the tower is effectively increased.

In the recycling operation, a portion of the product containing stream in line 20 is conducted off through line 21 to heat exchanger 22, wherein it is reheated before passing through line 23 to line 18, wherein it joins the fresh feed gas stream entering at the bottom of the chlorination tower 17.

The reacted melt, issuing from the bottom of the reaction tower through line 24, and passing through the exchanger 22, serves to reheat the recycle gas stream by indirect exchange. The melt then leaves the exchanger through line 25, provided with a suitable pump 26, and is conducted to heat exchanger 15, wherein it gives up an additional quantity of its heat to that portion of the melt passing through the exchanger, from line 13. The reacted melt is then forced up through line 27, into cooler 28, wherein it is further cooled to the desired temperature range of from 250° C. to 400° C., before returning to the top of the tower through line 2, for recycling through the process.

In my copending application, referred to above, I have proposed an alternative method of operating the tower for the oxychlorination reaction, whereby the conversion of the cuprous chloride is carried out in two completely separate steps. Employment of this method for the production of cupric chloride may be used, especially where an even more complete utilization of hydrochloric acid is desired, although the production capacity of the process is lowered somewhat per unit throughput of the salt melt.

My invention lends itself to the chlorination of any type of hydrocarbon compound, i. e., aliphatic, aromatic or alicyclic, which is volatile at temperatures less than 400° C. Some typical hydrocarbons readily chlorinated by my process, besides methane, are light paraffins such as: ethane, propane and the like; aromatic hydrocarbons such as: benzene, toluene and the like; cyclopropane, cyclobutane and the like, and olefins such as ethylene, propylene, etc.

As one might expect in the chlorination of higher aliphatic hydrocarbons by my process, some cracking and side reactions take place. For example, in the case of butane the reaction product will contain in addition to the primary halide, dihalides, unsaturated halides and olefins. The extent of these secondary reactions may be controlled by regulating the temperature of the reaction zone and the contact time. The products of these secondary reactions are readily separated from the main reaction product and represent valuable by-products.

In copending application, Serial No. 507,616, I have stated the preferred temperature range in contact tower 1 to be from 350° C. to 425° C. Temperatures higher than 425° C. and as high as 475° C. may be attained by the melt in passing down the tower but the temperature of the melt in the upper portion of the tower should not be greater than 400° C., otherwise an appreciable amount of chlorine will be evolved and escape from the tower. Temperatures below 200° C. are not satisfactory since under the conditions complete removal of water vapor from the melt is not assured, and the reaction becomes too slow. Where the copper halides are circulated as melts, temperatures below 250° C. for the oxychlorination reaction are not practical since salt mixtures having melting points safely below this figure would not contain sufficient copper chlorides to make the process satisfactory. Also, I have illustrated the reaction zone of tower 17, as being operated at a temperature from 325° C. to 500° C. As hereinbefore stated, the most favorable operating temperature varies within this range according to the particular hydrocarbon being chlorinated. At temperatures above 500° C., however, excessive pyrolytic decomposition of organic halide products is likely to occur, particularly, with aliphatic hydrocarbons of higher molecular weight.

The reaction between hydrocarbons and cupric chloride to form alkyl and aryl halides is in general either exothermic or substantially thermoneutral in nature. In the case of certain hydrocarbons, such as methane, however, the reaction may be slightly endothermic. The oxychlorination of cuprous chloride, however, is highly exothermic. If therefore, the reaction conditions in the separate stages of my process are carefully controlled, only very little heat or none at all need be supplied to the process. Thus, the melt circulating through the process may be utilized as a heat transfer medium to carry the heat evolved by the oxychlorination of the melt, in the first stage, to the chlorination of the hydrocarbons, in the second stage. This heat transfer by the melt is most efficient when the amount of reaction in both steps of the process is regulated to effect a rather small change in the cupric chloride content of the melt, and when heat losses, due to radiation through the walls of the reaction towers, are kept at a minimum. The melt, near the top of the oxychlorination tower, is preferably maintained at a temperature of from 325° C. to 375° C., to prevent the formation of chlorine. As the melt passes down through the tower 1, however, it heats up due to the exothermic oxychlorination reaction occurring therein. The relative amount of melt reacting is controlled by controlling either the amount of melt circulating, or the amount of air or both so that the melt attains a temperature of from 425° C. to 475° C. on reaching the bottom of the tower. The hot melt then circulates to tower 17 for contacting with the hydrocarbon gas. In instances where the reaction between the particular hydrocarbon being chlorinated and the melt is endothermic in nature the heat evolved in the oxychlorination reaction will be more than sufficient to replenish the heat absorbed by the chlorination reaction in tower 17. The excess heat contained in the melt leaving tower 17 is utilized in exchangers 22 and 15, as hereinbefore described, thereby permitting the entire process to be carried out in thermally self-sufficient manner. If necessary the melt after leaving exchanger 15 may be further cooled by any suitable means, before returning to the top of tower 1.

The chlorination temperature of tower 17 may be lowered somewhat by carrying out this stage of the process under moderate pressure, i. e., about 10 to 20 atmospheres. This moderate pressure will produce a constant stream of product containing gas through line 20, thus facilitating recovery of the product.

It is not practical to carry out the oxychlorination reaction in tower 1, to effect complete conversion of cuprous to cupric chloride, because the solubility of cupric chloride in the mixed salt melt is limited, and the rate of the reaction decreases as the cupric chloride concentration increases.

The solubility of the cupric chloride depends on the composition of the melt employed. For example in the case of a copper chloride-potassium chloride melt, having a concentration of less than 30 percent of potassium chloride, the cupric chloride will precipitate out if the concentration exceeds 40 to 70 percent of the total copper present, the particular value depending on the temperature at which the melt issues from the bottom of the tower and the potassium chloride content. The solubility of cupric chloride on the basis of total copper may be increased to as high as 95 percent, however, by increasing the amount of potassium chloride in the melt. I have found that a double salt is formed between the copper and potassium chlorides which corresponds to the formula $K_2CuCl_4$. This salt is stable at the temperatures employed in the process. Consequently, the increased solubility of the cupric salt by addition of potassium chloride above 40 mol percent does not make more cupric chloride available for dechlorination in the process. For this reason employment of melts having concentrations in excess of 40 mol percent potassium chloride is not recommended.

In the preferred embodiment of my invention I employ copper halide melts. However, since copper halides have rather high melting points, it is usually desirable to add other halides to the melts in order to lower their melting points. It is necessary that the type of halide added be resistant to the action of oxygen and water vapor at temperatures below 475° C., and also that they be relatively non-volatile. In addition, it is desirable that relatively small additions of these other halides cause relatively large depressions in the freezing point. Especially useful from this point of view are the alkali metal halides, particularly the chlorides. Certain halides of the metals in groups I, II, III and IV of the periodic system, having molecular weights greater than copper, such as those of lead, zinc, silver and thallium may be used in place of, or together with, the alkali metal halides.

The use of melts which are capable of being circulated through the various process stages in the manner heretofore described, provides a practical and economical method for the manufacture of organic halides from hydrochloric acid and hydrocarbons because the operation of the process is continuous; the heat losses and unproductive periods, inherent in processes employing stationary contact masses, are wholly eliminated.

Although the use of salt melts is particularly advantageous from the viewpoint of continuous operation, I do not wish to restrict my invention to the use of melts only. Thus solids, such as pumice, impregnated with copper halides may be circulated through the various stages of my process, by any of the methods disclosed in the prior art. The copper halides themselves need not necessarily be in the molten form in all of the stages of the process, particularly where temperatures in the lower portion of the range indicated for the oxychlorination steps are used or where additional salts to lower the melting point of the copper halides are not used.

The amount of oxygen absorbed from the air, by the melt, is controlled by the rate of passage of air through the contact zone, the pressure of the gas, the length of the said zone and the efficiency of the packing therein. Moderate air pressures generally give rapid and efficient absorption of oxygen in the melt although operation at atmospheric pressure gives satisfactory results. Air pressures between 1 and 25 atmospheres may be employed, however, the preferred range is between 1 and 15 atmospheres. Absorption of from 35 to 75 percent of the oxygen from the contacting air are readily attainable. In general it is not practical to attempt to remove all the oxygen from the air passing through the tower.

The reaction of the hydrogen chloride gas with the oxidized melt is rapid and quantitative. For efficient utilization of this gas, the amount thereof admitted to the tower, as hereinbefore stated, should be controlled, so as to maintain a ratio of not more than 4 moles of hydrogen chloride per mole of oxygen entering the tower.

The procedure illustrated in the description of my invention for providing efficient contact between the melt and the reacting gases consists in dispersing the melt over a contact mass in the gas stream. An equally effective method that may be used is to disperse the gases in the body of the melt. The dispersal may be effected by forcing the gas, in the form of fine bubbles, to ascend through the melt, by any of the known means, such as by porous plates or thimbles. Several stages may be used by dispersing the gas in different portions of melt while the melt is passed continuously from one stage to another.

Throughout the preceding description of my invention I have referred to the compound formed by the oxidation of cuprous chloride with an oxygen containing gas as cupric oxychloride, and have ascribed to it the formula $CuCl_2.CuO$. Under the reaction conditions used this seems to be the compound formed since one mole of oxygen will be taken up per two moles of cuprous chloride oxidized. Whether or not this is the exact structure of the compound formed is immaterial to the process of the invention. Throughout the specification and claims by the term "cupric oxychloride," I refer to the partially oxidized cuprous chloride melt obtained by heating cuprous chloride in contact with air, and containing up to one mole of oxygen per two moles of cuprous chloride.

The following examples will serve to illustrate how hydrogen chloride may be quantitatively fixed by cuprous chloride to form cupric chloride and also the ease with which cupric chloride is reduced by methane and ethane to form methyl chloride and ethyl chloride.

Example 1

Air was bubbled at the rate of 17 cc. per second, through 65 cc. of cuprous chloride salt melt contained in a Pyrex trap at 390° C. The initial composition of the melt was 85 mole percent of cuprous chloride and 15 mole percent of potassium chloride. An average of 9 percent of oxygen was removed from the air passing through the melt. After 1.1 grams of oxygen had been absorbed by the melt, a mixture, comprising 24 volume percent of hydrogen chloride and 76 volume percent of air, was passed through the melt at a rate of 20 cc. per second for four minutes. A total of 91 percent of the hydrogen chloride was adsorbed by the melt, to form cupric chloride.

Example 2

The same sample of melt as in Example 1, was further oxygenated at a temperature of 375° C., until a total of 5 grams of oxygen had been absorbed. Hydrogen chloride was then passed through the melt, at the rate of 4 cc. per second, for 15 minutes. A total of 99 percent of the hydrogen chloride was absorbed by the melt. The melt after this experiment contained 46 mole percent of copper in the cupric form.

Example 3

Methane was bubbled at 23 liters per hour through 100 cc. of a copper chloride melt maintained at 450° C. The melt contained 15 mole percent potassium chloride and 85 mole percent of copper halides. Approximately 65 percent of the copper was present initially as cupric chloride while the remainder was cuprous chloride. During the first thirty minutes of the run the amount of chlorination obtained was equivalent to 0.53 mole of chlorine reacting with one mole of methane. The product contained 63.1 mole percent of monochloro compounds consisting almost entirely of methyl chloride with a few percent of ethyl and propyl chlorides formed from the small amounts of ethane and propane present as impurities in the methane. The remainder of the product consisted of 23 mole percent of methylene chloride and smaller amounts of chloroform and carbon tetrachloride.

Example 4

Ethane was dispersed by means of a porous thimble through 150 cc. of a circulating copper chloride-potassium chloride salt melt. The temperature of the melt in the reaction zone was maintained at 445° C., while the gas was admitted at the rate of 25 liters per hour. The melt passing through the reaction zone had an average concentration of 20 mol percent of cupric chloride. 30.2 mol percent of the ethane gas was reacted. The product, after separation of hydrogen chloride and unreacted ethane therefrom, had the composition given below:

| Product | Mol per cent | Weight per cent |
|---|---|---|
| $C_2H_5Cl$ | 60.3 | 50.1 |
| $C_2H_4$ | 2.8 | 1.0 |
| $C_2H_4Cl_2$ | 24.6 | 31.5 |
| $C_2H_3Cl$ | 5.6 | 4.5 |
| $C_2H_3Cl_3$ | 3.3 | 5.6 |
| $C_2H_2Cl_4$ | 3.4 | 7.3 |

The foregoing description of my invention has included only certain exemplary embodiments thereof, and my invention is not to be construed as limited, except as indicated in the appended claims.

I claim:

1. A continuous process for the production of organic chlorides from hydrochloric acid and hydrocarbons which comprises: contacting a metallic chloride melt comprising cuprous chloride with an oxygen containing gas and hydrochloric acid gas in a reaction zone, at a temperature within the range of from 250° C. to 475° C., to form cupric chloride from the cuprous chloride, removing the water vapor from the reaction zone, circulating the cupric chloride enriched melt to a second reaction zone, contacting the cupric chloride enriched melt in said second zone with the hydrocarbon, at a temperature of from 325° C. to 500° C., to form an organic chloride and reform cuprous chloride, recycling at least a substantial portion of the reformed cuprous chloride melt to the first reaction zone, and recovering the said organic chloride.

2. A continuous process for the production of alkyl chlorides from hydrogen chloride and aliphatic hydrocarbons which comprises: contacting a metallic chloride melt comprising cuprous chloride with an oxygen containing gas and hydrogen chloride in a reaction zone, at a temperature within the range of from 250° C. to 475° C., to form cupric chloride from the cuprous chloride, removing the water vapor from said reaction zone, circulating the cupric chloride enriched melt to a second reaction zone, contacting the cupric chloride enriched melt in said second zone with the aliphatic hydrocarbon in the gaseous state, at a temperature of from 325° C. to 500° C., to form an aliphatic chloride and reform cuprous chloride, recycling at least a substantial portion of the reformed cuprous chloride melt to the first reaction zone, and recovering the alkyl chloride.

3. A continuous process for the production of aryl chlorides from hydrogen chloride and aromatic hydrocarbons which comprises: contacting a metallic chloride melt comprising cuprous chloride with an oxygen containing gas and hydrogen chloride in a reaction zone, at a temperature within the range of from 250° C. to 475° C., to form cupric chloride from the cuprous chloride, removing the water vapor from said reaction zone, circulating the cupric chloride enriched melt to a second reaction zone, contacting the cupric chloride enriched melt in the said second zone with the aromatic hydrocarbon in the gaseous state, at a temperature of from 325° C. to 500° C., to form an aryl chloride and reform cuprous chloride, recycling the reformed cuprous chloride melt to the first mentioned reaction zone, and recovering the aryl chloride.

4. A continuous process for the production of organic chlorides from hydrochloric acid and hydrocarbons which comprises: contacting a metallic chloride melt, comprising a major proportion of cuprous chloride and minor proportions of cupric chloride and potassium chloride, with an oxygen containing gas and hydrochloric acid gas in a reaction zone at a temperature within the range of from 250° C. to 475° C., to form cupric chloride from the cuprous chloride, removing the water vapor from said reaction zone, circulating the cupric chloride enriched melt to a second reaction zone, contacting the cupric chloride enriched melt in said second zone with the hydrocarbon, at a temperature of from 325° C. to 500° C., to form an organic chloride and reform cuprous chloride, circulating the reformed cuprous chloride melt to the first reaction zone, and recovering the organic chloride.

5. A continuous process for the production of methyl chloride from hydrogen chloride and methane which comprises: contacting a metallic chloride melt comprising a major portion of cuprous chloride in a reaction zone, at a temperature of 250° C. to 475° C., with an oxygen containing gas and hydrogen chloride, to form cupric chloride, removing water vapor from the said reaction zone, circulating the melt to a second zone, contacting the melt in said second zone with the methane gas, at a temperature within the range of from 325° C. to 500° C., to form methyl chloride and reform cuprous chloride, circulating the reformed cuprous chloride melt to the first reaction zone, and recovering the methyl chloride.

6. A continuous process for the production of organic chlorides from hydrochloric acid and hydrocarbons which comprises: circulating a metallic chloride melt comprising a major portion of cuprous chloride downward through a reaction zone, at a temperature of from 250° C. to 475° C., contacting the melt therein with an oxygen containing gas and hydrochloric acid gas, to form cupric chloride, removing water vapor from the said zone, circulating the melt to a second separate zone, contacting the melt therein with the hydrocarbon in the gaseous state, at a temperature of from 325° C. to 500° C., to form an organic chloride and reform cuprous chloride, recovering the organic chloride and circulating the melt back to said first reaction zone for recycling through the process.

7. A continuous process for the production of organic chlorides from hydrochloric acid and hydrocarbons which comprises: circulating a metallic chloride melt comprising a major portion of cuprous chloride downward through a reaction zone, at a temperature of from 250° C. to 475° C., contacting the melt therein with an oxygen containing gas and hydrochloric acid gas, to form cupric chloride, removing water vapor from the said zone, circulating the melt to a second separate zone, contacting the melt therein with the hydrocarbon in the gaseous state, at a temperature of from 325° C. to 500° C., to form an organic chloride and reform cuprous chloride, recycling a portion of the product containing gas stream, issuing from said second reaction zone, back through said second zone for further contacting with the chlorinated melt to increase the concentration of said organic chloride in said product stream, and returning the melt to said first reaction zone for recycling through the process.

8. A continuous process for the production of organic chlorides from hydrogen chloride and hydrocarbons which comprises: circulating a metallic chloride melt comprising a major portion of cuprous chloride downwardly through a reaction zone, at a temperature of from 250° C. to 475° C., contacting the said melt therein, first with an oxygen containing gas, and then with a mixture of an oxygen containing gas and hydrogen chloride gas, to form cupric chloride, removing water vapor from the said reaction zone, circulating the chlorinated melt to a second separate reaction zone, contacting the melt in said second zone with a preheated hydrocarbon compound while maintaining the temperature of the said second zone at a temperature above 325° C., to form an organic chloride and reform cuprous chloride, recycling a portion of the product containing gas stream issuing from said second zone back through said second zone for further contacting with said chlorinated melt to increase the concentration of organic chloride in said product containing stream, and circulating the melt back to said first reaction zone for recycling through the process.

9. A continuous process for the production of methyl chloride from hydrochloric acid and methane which comprises: circulating a metallic chloride melt comprising a major portion of cuprous chloride downward through a reaction zone, at a temperature of from 250° C. to 475° C., contacting the melt therein first with an oxygen containing gas, and then with a mixture of an oxygen containing gas and hydrochloric acid gas, to form cupric chloride, removing water vapor from the said zone, circulating the chlorinated melt to a second reaction zone, contacting the melt in said second zone with preheated methane, at a temperature of from 375° C. to 500° C., to form methyl chloride and reform cuprous chloride, recycling a portion of the product containing gas stream, issuing from said second reaction zone back through said second zone, for further contacting with the chlorinated melt therein to increase the concentration of methyl chloride in said product containing stream, recovering the methyl chloride, and circulating the melt back to said first reaction zone for recycling through the process.

10. A continuous process for the production of organic chlorides from hydrochloric acid and hydrocarbons which comprises: circulating a metallic chloride melt comprising a major portion of cuprous chloride through a reaction zone, at a temperature of from 350° C. to 425° C., contacting the melt therein with an oxygen containing gas and then with a mixture of an oxygen containing gas and hydrochloric acid gas, controlling the rate of admission of said oxygen containing gas and said hydrogen chloride gas, so that a ratio of about 4 moles of hydrogen chloride to one mole of total oxygen is maintained with respect to the gases passing into the said reaction zone, circulating the chlorinated melt to a second reaction zone, contacting the melt in said second zone with a preheated hydrocarbon compound, at a temperature of from 325° C. to 500° C., to form an organic chloride and reform cuprous chloride, recycling a portion of the product containing gas stream, issuing from said second reaction zone, through said second zone for further contacting with the melt therein, recovering the said formed organic chloride, and circulating the dechlorinated melt back to said first reaction zone for recycling through the process.

11. A continuous process for the production of organic chlorides from hydrogen chloride and hydrocarbons which comprises: contacting a circulating metallic chloride melt comprising a major portion of cuprous chloride with a mixture of an oxygen containing gas and hydrogen chloride gas, in a reaction zone, at a temperature of from 250° C. to 475° C., to form cupric chloride, removing water vapor from the said zone, and then in a second separate zone, contacting the melt with a hydrocarbon in the gaseous state, at a temperature of from 325° C. to 500° C., to form an organic chloride and reform cuprous chloride, recycling a portion of the product containing gas stream issuing from the said second reaction zone back through the said second zone for further contacting with the chlorinated salt melt therein, separating hydrogen chloride gas from the remainder of the product stream, returning the separated hydrogen chloride gas to the first reaction zone for further use in oxychlorination step of the process, recovering the organic chloride freed from hydrogen chloride and returning the cuprous chloride containing melt issuing from the said second reaction zone to the said first reaction zone for recycling through the process.

12. A continuous process for the production of organic chlorides from hydrogen chloride and hydrocarbons which comprises: circulating a metallic chloride melt, comprising a major portion of cuprous chloride, downward through a reaction zone, at a temperature of from 250° C. to 475° C., contacting the melt therein first with an oxygen containing gas and then with a mixture of an oxygen containing gas and hydrogen chloride gas, to form cupric chloride, removing water vapor from the said zone, circulating the melt to a second separate reaction zone, contacting the melt therein with the hydrocarbon in the gaseous state, at a temperature of from 325° C. to 500° C., to form an organic chloride and cuprous chloride, separating hydrogen chloride from the product containing gas stream issuing from the said second reaction zone, returning the separated hydrogen chloride gas to the first reaction zone for reuse in the oxychlorination step of the process, recovering the organic chloride from the said product stream, and returning the melt issuing from the said second reaction zone to the said first reaction zone for recycling through the process.

13. A continuous process for the production of organic chlorides from hydrogen chloride and hydrocarbons which comprises: admitting a metallic chloride melt comprising a major portion of cuprous chloride to a reaction zone, at a temperature of from 325° C. to 400° C., contacting the melt therein with an oxygen containing gas and hydrogen chloride gas to form cupric chloride, regulating the extent of the oxychlorination reaction so that the temperature of the melt in the said reaction zone does not exceed 475° C., removing water vapor from the said zone, circulating the melt to a separate zone, contacting the melt therein with the hydrocarbon, at a temperature within the range of from 325° C. to 500° C., to form an organic chloride and reform cuprous chloride in the said melt, circulating the reformed cuprous chloride melt to the first reaction zone, and recovering the organic chloride.

14. A continuous process for the production of organic chlorides from hydrochloric acid and hydrocarbons which comprises: admitting a circulating metallic chloride melt comprising a major portion of cuprous chloride to the top of a reaction zone, at a temperature of from 325° C. to 400° C., contacting the melt therein with a mixture of an oxygen containing gas and hydrochloric acid gas to form cupric chloride, controlling the extent of the oxychlorination reaction so that the temperature of the melt in the said zone does not exceed 475° C., removing water vapor from the said zone, circulating the melt to a separate second zone, contacting the melt therein with the hydrocarbon in the gaseous state, at a temperature of from 325° C. to 500° C., to form an organic chloride and reform cuprous chloride in the said melt, recovering the organic chloride and circulating the melt back to said first reaction zone for recycling through the process.

15. A continuous process for the production of aliphatic-hydrocarbon chlorides from hydrogen chloride and aliphatic hydrocarbons which comprises: passing an oxygen containing gas and hydrogen chloride in contact with cuprous chloride in a reaction zone while maintaining the temperature within the range of from 200° C. to 475° C. to form cupric chloride, removing water vapor from said reaction zone, circulating the cupric chloride to a separate reaction zone, contacting the cupric chloride with at least one aliphatic hydrocarbon in said separate reaction zone at a temperature above 325° C. to chlorinate the hydrocarbon and reform cuprous chloride from the cupric chloride, circulating the reformed cuprous chloride to the first mentioned reaction zone and recovering the aliphatic-hydrocarbon chloride formed.

16. A continuous process for the production of aliphatic-hydrocarbon chlorides from hydrogen chloride and natural gas which comprises passing an oxygen containing gas and hydrogen chloride in contact with cuprous chloride in a reaction zone while maintaining the temperature within the range of from 200° C. to 475° C. to form cupric chloride, removing water vapor from said reaction zone, circulating the cupric chloride to a separate reaction zone, contacting the cupric chloride with a stream of natural gas in said second reaction zone at a temperature above 325° C. to chlorinate the hydrocarbon components of said natural gas and to reform cuprous chloride from the cupric chloride, circulating the reformed cuprous chloride to the first mentioned reaction zone and recovering the aliphatic-hydrocarbon chlorides formed.

17. A continuous process for the production of aliphatic-hydrocarbon chlorides from hydrogen chloride and aliphatic hydrocarbons which comprises the steps of (1) passing an oxygen containing gas and hydrogen chloride in contact with cuprous chloride in a reaction zone while maintaining the temperature within the range of from 200° C. to 475° C. to form cupric chloride, (2) removing water vapor from said reaction zone, (3) circulating the cupric chloride to a separate reaction zone, (4) contacting the cupric chloride with at least one aliphatic hydrocarbon in said separate reaction zone at a temperature above 325° C. to chlorinate said hydrocarbon, to simultaneously form hydrogen chloride, and to reform cuprous chloride from the cupric chloride, (5) circulating the reformed cuprous chloride to the reaction zone of step 1, (6) separating the chlorinated aliphatic-hydrocarbon product from the hydrogen chloride formed in step 4, (7) circulating the hydrogen chloride separated in step 6 to the reaction zone of step 1, and (8) recovering aliphatic-hydrocarbon chloride product from step 6 of the process.

EVERETT GORIN.